(12) United States Patent
Graceffo et al.

(10) Patent No.: US 11,681,169 B2
(45) Date of Patent: Jun. 20, 2023

(54) ELECTRICALLY CONFIGURABLE OPTICAL FILTERS

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 246 days.

(21) Appl. No.: 16/913,138

(22) Filed: Jun. 26, 2020

(65) Prior Publication Data

US 2020/0409189 A1 Dec. 31, 2020

Related U.S. Application Data

(60) Provisional application No. 62/866,907, filed on Jun. 26, 2019.

(51) Int. Cl.
*G02F 1/03* (2006.01)

(52) U.S. Cl.
CPC ................. *G02F 1/0344* (2013.01)

(58) Field of Classification Search
CPC .. G02B 27/106; G02B 27/123; G02B 27/144; G02B 6/28; G02B 6/29383; G02B 6/29385; G02B 6/29362; G02F 1/03; G02F 1/0344; G02F 1/035; G02F 1/0311; G02F 1/0327; G01S 7/489; G01S 7/4868; G01S 7/487

USPC ............... 359/245, 333, 278, 279, 579, 824; 398/208, 130, 201; 356/5.01, 4.01; 372/38.02
See application file for complete search history.

(56) References Cited

U.S. PATENT DOCUMENTS

| | | | |
|---|---|---|---|
| 9,018,575 B2 | 4/2015 | Kowalevicz et al. |
| 9,165,963 B2 | 10/2015 | Kowalevicz et al. |
| 9,171,219 B2 | 10/2015 | Kowalevicz |
| 9,323,034 B2 | 4/2016 | Dolgin |
| 9,400,414 B2 | 7/2016 | Kowalevicz |
| 9,451,185 B2 | 9/2016 | Dolgin et al. |
| 9,503,660 B2 | 11/2016 | Kowalevicz et al. |
| 9,535,245 B1 | 1/2017 | Kowalevicz |
| 9,538,096 B2 | 1/2017 | Dolgin |
| 9,887,779 B2 | 2/2018 | Kowalevicz |
| 9,973,281 B2 | 5/2018 | Kowalevicz et al. |
| 10,164,765 B2 | 12/2018 | Dolgin et al. |
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,340,965 B2 | 7/2019 | Dolgin et al. |
| 10,374,743 B2 | 8/2019 | Dolgin et al. |

(Continued)

*Primary Examiner* — Jie Lei

(74) *Attorney, Agent, or Firm* — Lando & Anastasi, LLP

(57) ABSTRACT

Aspects and examples are directed to programmable optical finite impulse response filters and optical infinite impulse response filters, which may be implemented as photonic integrated circuits.

17 Claims, 5 Drawing Sheets

(56) References Cited

U.S. PATENT DOCUMENTS

| | | | |
|---|---|---|---|
| 10,378,880 B2 | 8/2019 | Dolgin et al. | |
| 10,498,464 B2 | 12/2019 | Graceffo et al. | |
| 10,530,494 B2 | 1/2020 | Dolgin et al. | |
| 10,554,306 B1 | 2/2020 | Graceffo et al. | |
| 10,571,774 B2 | 2/2020 | Graceffo et al. | |
| 10,637,580 B2 | 4/2020 | Dolgin et al. | |
| 10,686,533 B2 | 6/2020 | Dolgin et al. | |
| 10,714,251 B2 | 7/2020 | Dolgin et al. | |
| 10,826,603 B1 | 11/2020 | Kowalevicz et al. | |
| 10,924,189 B2 | 2/2021 | Kowalevicz et al. | |
| 11,012,160 B2 | 5/2021 | Kowalevicz et al. | |
| 11,101,896 B2 | 8/2021 | Kowalevicz et al. | |
| 11,133,873 B1 | 9/2021 | Kowalevicz et al. | |
| 11,159,244 B2 | 10/2021 | Graceffo et al. | |
| 11,159,245 B2 | 10/2021 | Kowalevicz et al. | |
| 11,258,516 B2 | 2/2022 | Graceffo et al. | |
| 11,290,191 B2 | 3/2022 | Graceffo et al. | |
| 11,303,356 B1 | 4/2022 | Kowalevicz et al. | |
| 11,307,395 B2 | 4/2022 | Kowalevicz et al. | |
| 11,309,964 B1 | 4/2022 | Kowalevicz et al. | |
| 11,349,569 B2 | 5/2022 | Graceffo et al. | |
| 11,353,774 B2 | 6/2022 | Kowalevicz et al. | |
| 11,374,659 B2 | 6/2022 | Graceffo et al. | |
| 2004/0128113 A1* | 7/2004 | Gerrish | H03H 17/04 |
| | | | 702/190 |
| 2016/0277119 A1* | 9/2016 | Sinsky | H04B 10/674 |
| 2019/0334540 A1* | 10/2019 | Kobayashi | G01C 9/06 |
| 2021/0021449 A1 | 1/2021 | Graceffo et al. | |
| 2021/0041515 A1 | 2/2021 | Dolgin | |
| 2021/0099234 A1 | 4/2021 | Graceffo et al. | |
| 2021/0314071 A1 | 10/2021 | Graceffo et al. | |
| 2022/0014276 A1 | 1/2022 | Kowalevicz et al. | |
| 2022/0182147 A1 | 6/2022 | Kowalevicz et al. | |

* cited by examiner

ELECTRICALLY CONFIGURABLE OPTICAL FILTERS

CROSS-REFERENCE TO RELATED APPLICATION

This application claims priority under 35 U.S.C. § 119(e) to U.S. Provisional Application Ser. No. 62/866,907, titled "ELECTRICALLY CONFIGURABLE OPTICAL FILTERS," filed on Jun. 26, 2019, which is hereby incorporated by reference in its entirety.

BACKGROUND

Finite Impulse Response (FIR) and Infinite Impulse Response (IIR) filters are integral parts of both the analog and digital signal processing tool suite.

An example of a generic digital IIR filter 100 is shown in FIG. 1. The digital signal X[n] is filtered by both summing a series of delayed versions of the signal that are weighted by the coefficients $B_0$ through $B_n$, and summing X[n] with delayed versions of the output signal Y[n], which are weighted by the coefficients $A_1$ through $A_n$. The delays are represented by the $z^{-1}$ blocks 110. Each delay is equal to one-bit period. The summing is performed by a plurality of summers 120, as shown. A first plurality of amplifiers 130 have gain values to provide the coefficients $A_1$ through $A_n$, and a second plurality of amplifiers 140 have gain values to provide the coefficients $B_0$ through $B_n$.

An example of a digital FIR filter 200 is shown in FIG. 2. The digital signal X[n] is filtered by summing a series of delayed versions of the signal that are weighted by the coefficients B0 through Bn, to provide the output signal Y[n]. The delays are represented by the z−1 blocks 210. As in the case of the IIR filter 100, each delay is equal to one-bit period. The summing is performed by a plurality of summers 220, as shown. A plurality of amplifiers 230 have gain values to provide the coefficients $B_0$ through $B_n$.

As the speed of optical communications continues to increase, there is an increasing need to move more of the signal processing into the optical domain. However, limited work has been done in the area of optical FIR and IIR filters, and that work has mostly used silicon substrates.

SUMMARY OF THE INVENTION

Aspects and embodiments are directed to optical circuit implementations for IIR and FIR filters with programmable parameters to accommodate varying bit rates of the input optical signals.

According to one embodiment, an optical infinite impulse response filter comprises an input configured to receive an input optical signal, an output configured to provide an output optical signal that is a filtered version of the input optical signal, a plurality of input filter taps coupled to the input and configured to provide a corresponding plurality of weighted taps of the input optical signal, a plurality of output filter taps coupled the output and configured to provide a corresponding plurality of weighted taps of the output optical signal, each of the plurality of input filter taps and each of the plurality of output filter taps including a variable delay and an individually addressable attenuator, a control bus coupled to each individually addressable attenuator and configured to provide a control signal to each individually addressable attenuator to set an attenuation value of the individually addressable attenuator, and a plurality of summers configured to receive and sum the plurality of weighted taps of the input optical signal and the plurality of weighted taps of the output optical signal to produce the output optical signal at the output.

In one example, the variable delay of each input filter tap and each output filter tap is implemented on a piezoelectric substrate, the optical infinite impulse response filter further including a control input coupled to the piezoelectric substrate and configured to receive a control voltage that controls an amount of phase delay provided by the piezoelectric substrate. In one example, the piezoelectric substrate is a Lithium Niobate substrate. In another example, the variable delay further includes at least one delay line. In one example, the at least one delay line includes a plurality of switchable delay lines.

The optical infinite impulse response filter may further comprise a gain element coupled to the input and configured to compensate for loss introduced by the individually addressable attenuators.

In one example, a delay value of the variable delay is a function of a bit rate of the input optical signal, and the optical infinite impulse response filter further comprises a control input configured to receive a control voltage that sets the delay value, the control voltage being adjustable to accommodate varying bit rates of the input optical signal, wherein the control voltage provides phase control of the output optical signal and the control signal on the control bus provides amplitude control of the output optical signal.

The optical infinite impulse response filter may further comprise a silicon substrate, wherein the optical infinite impulse response filter is implemented on the silicon substrate as a photonic integrated circuit.

According to another embodiment, an optical finite impulse response filter comprises an input configured to receive an input optical signal, an output configured to provide an output optical signal that is a filtered version of the input optical signal, a plurality of filter taps coupled to the input and configured to provide a corresponding plurality of weighted taps of the input optical signal, each filter tap including a variable delay and an individually addressable attenuator, a control bus coupled to each individually addressable attenuator and configured to provide a control signal to each individually addressable attenuator to set an attenuation value of the individually addressable attenuator, and a plurality of summers configured to receive and sum the plurality of weighted taps of the input optical signal to produce the output optical signal at the output.

In one example, the variable delay of each filter tap is implemented on a piezoelectric substrate, the optical finite impulse response filter further including a control input coupled to the piezoelectric substrate and configured to receive a control voltage that controls an amount of phase delay provided by the piezoelectric substrate. In another example, the piezoelectric substrate is a Lithium Niobate substrate. In one example, the variable delay further includes at least one delay line. In another example, the at least one delay line includes a plurality of switchable delay lines.

The optical finite impulse response filter may further comprise a gain element coupled to the input and configured to compensate for loss introduced by the individually addressable attenuators.

In one example, a delay value of the variable delay is a function of a bit rate of the input optical signal, and the optical finite impulse response filter further comprises a control input configured to receive a control voltage that sets the delay value, the control voltage being adjustable to accommodate varying bit rates of the input optical signal, wherein the control voltage provides phase control of the output optical signal and the control signal on the control bus provides amplitude control of the output optical signal.

The optical finite impulse response filter may further comprise a silicon substrate, wherein the optical finite impulse response filter is implemented on the silicon substrate as a photonic integrated circuit.

Aspects and embodiments include a method of operating an optical finite impulse response filter.

According to one embodiment, the method comprises receiving an input optical signal, operating a plurality of input filter taps to process the input signal to provide a corresponding plurality of weighted taps of the input optical signal, each of the plurality of input filter taps including a variable delay and an individually addressable attenuator; and operating a plurality of summers to receive and sum the plurality of weighted taps of the input optical signal to produce an output optical signal, the output optical signal being a filtered version of the input optical signal.

In one example, the method further comprises operating a control bus to provide a control signal to each individually addressable attenuator to set an attenuation value of the individually addressable attenuator.

In one example, the variable delay of each input filter tap is implemented on a piezoelectric substrate, and the method further comprises controlling an amount of phase delay provided by the piezoelectric substrate via a control voltage applied to the piezoelectric substrate.

According to one embodiment, the method comprises receiving an input optical signal, operating a plurality of input filter taps to process the input signal to provide a corresponding plurality of weighted taps of the input optical signal, each of the plurality of input filter taps including a variable delay and an individually addressable attenuator, operating a plurality of output filter taps to provide a corresponding plurality of weighted taps of the output optical signal, each of the plurality of output filter taps including a variable delay and an individually addressable attenuator, and operating a plurality of summers to receive and sum the plurality of weighted taps of the input optical signal and the plurality of weighted taps of the output optical to produce an output optical signal, the output optical signal being a filtered version of the input optical signal.

In one example, the method further comprises operating a control bus to provide a control signal to each individually addressable attenuator to set an attenuation value of the individually addressable attenuator.

In one example, the variable delay of each input filter tap is implemented on a piezoelectric substrate, and the method further comprises controlling an amount of phase delay provided by the piezoelectric substrate via a control voltage applied to the piezoelectric substrate.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
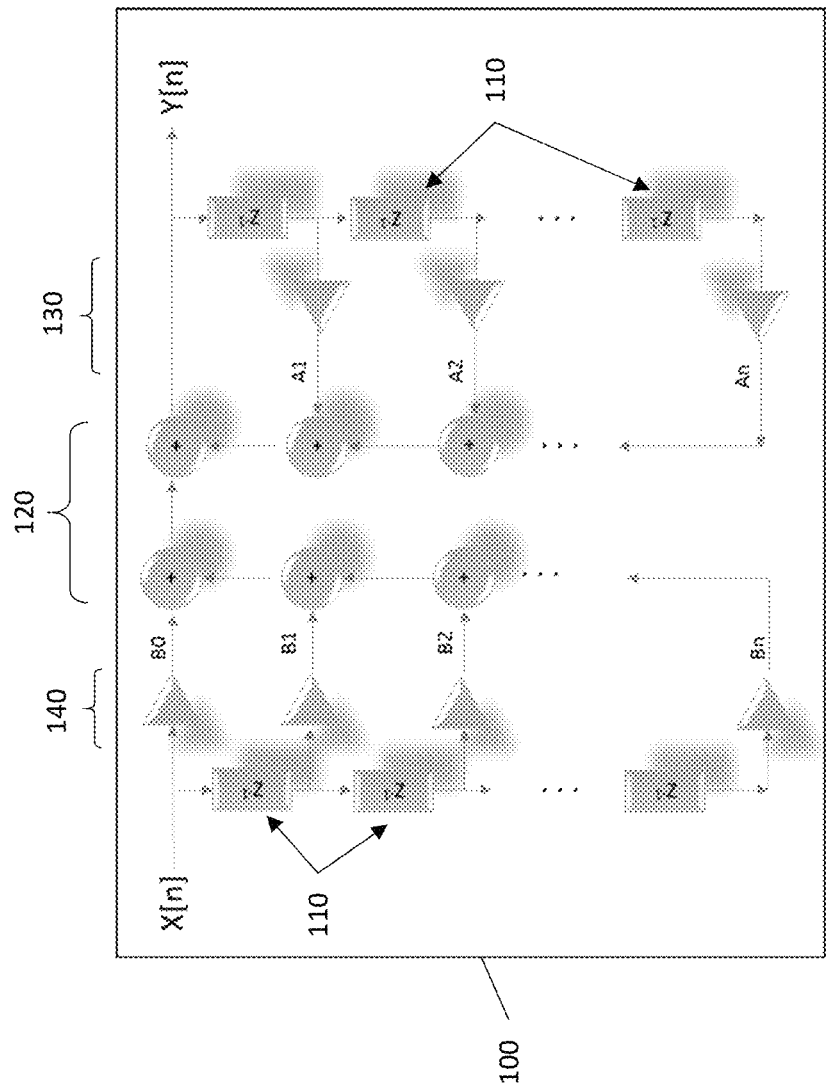
FIG. 1 is a diagram of an example of a digital IIR filter.
Figure 2:
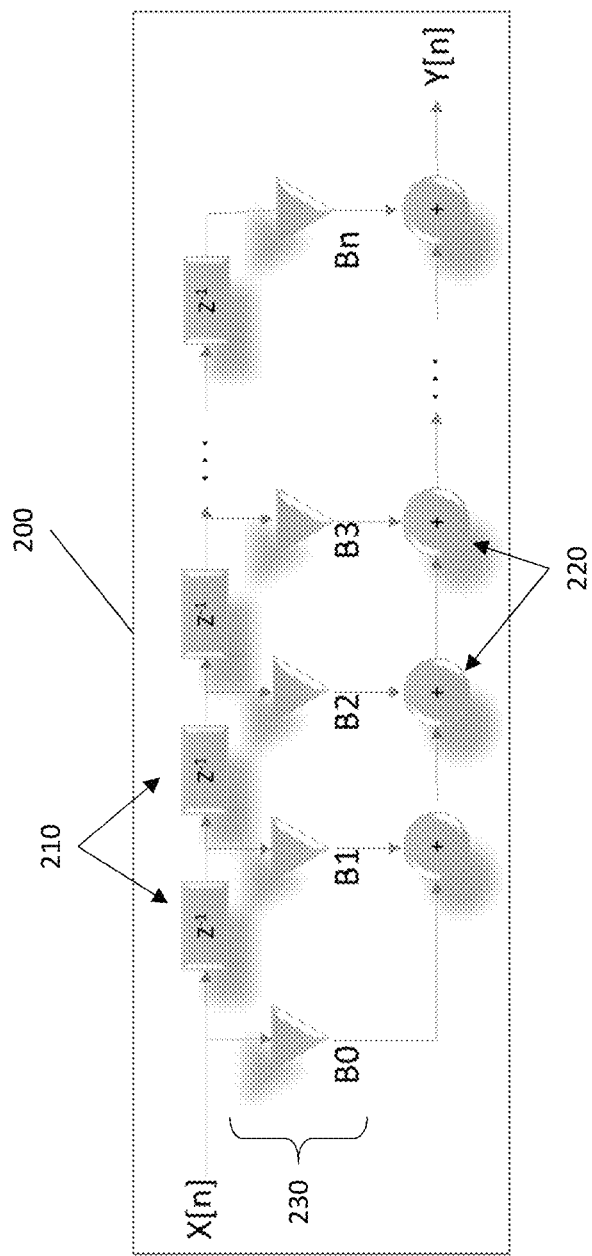
FIG. 2 is a diagram of an example of a digital FIR filter.

As discussed above, as the speed of optical communications continues to increase, there is an increasing need to move more of the signal processing into the optical domain. Therefore, the ability to perform matched filtering on optical signals prior to converting them to electrical signals is very desirable. Further, it is desirable to use electrical domain techniques to control the transfer function of the optical filter. Although some optical low-pass filters, band-pass filters, and high-pass filters have been implemented with tunable wavelengths, conventional filters do not allow for electrically programming the filter coefficients.

Aspects and embodiments are directed to providing optical analogues of an IIR filter and a FIR filter, where the filter coefficients determine the tap weights. In particular, certain aspects and embodiments provide a method for implementing an electrically controllable optical IIR filter. Certain other aspects and embodiments provide a method for implementing an electrically controllable optical FIR filter. As discussed in more detail below, according to certain embodiments, an IIR filter architecture and an FIR filter architecture are each replicated in the analog optical domain. Further, the bit duration and the filter shape are both made electrically configurable.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Figure 3:
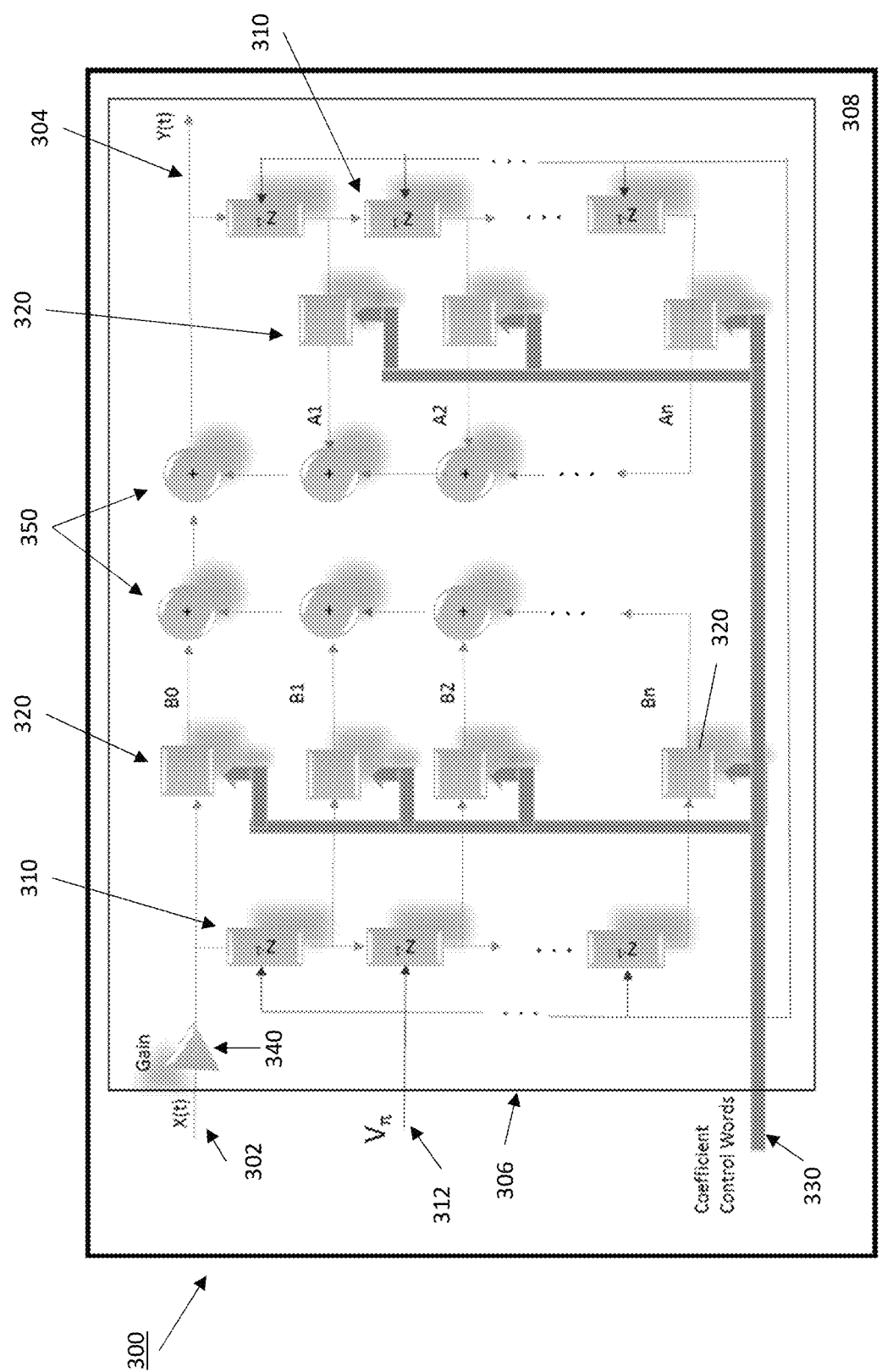
FIG. 3 is diagram of one example of an analog optical IIR filter according to aspects of the present invention.

Referring to FIG. 3, there is illustrated a block diagram of an example on an optical IIR filter 300 according to certain embodiments. The optical input signal supplied at an input 302 of the filter 300 is represented by X(t) and the optical output signal supplied at an output 304 of the filter 300 is represented by Y(t). The optical input signal may be a phase modulated or intensity modulated optical signal. In certain examples, both the input 302 and the output 304 can be fiber coupled, although that is not a requirement. The filter 300 includes a plurality of delays 310. As with a digital IIR filter, the delays 310 may be fixed as a function of a bit duration, and therefore, all the delays 310 may be the same duration. However, in certain examples, variable delay may be needed to accommodate different bit rates. According to certain embodiments, the variable delay can be implemented in two ways depending on the amount of delay required. For high speed optical processing, a material such as Lithium Niobate (LiNbO$_3$) may be used. Thus, the delays 310 may be implemented on a Lithium Niobate (or other piezoelectric material) substrate 306 that is coupled to a second substrate 308, which may be silicon for example, on which other components of the filter 300 are implemented. The delay introduced by the Lithium Niobate substrate 306 is a function of an applied control voltage 312 ($V_\pi$). Thus, by adjusting the control voltage 312, the amount of delay can be varied to adjust to a given bit rate of the optical input signal X(t). The control voltage 312 provides phase control of the optical output signal Y(t).

Figure 4:
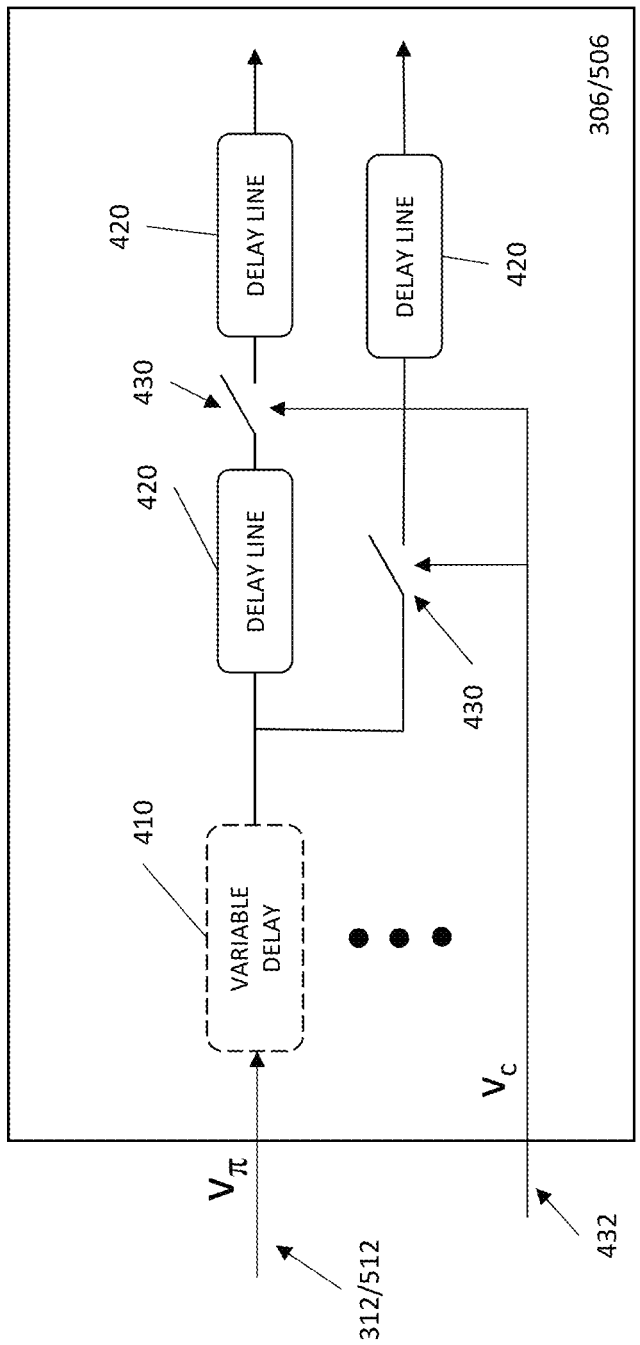
FIG. 4 is a diagram showing an example of an implementation for at least some of the delays in the analog optical IIR filter of FIG. 3 or analog optical FIR filter of FIG. 5, according to aspects of the present invention.

According to certain embodiments and applications, for example, for processing of optical signals modulated at radio frequency (RF) data rates, a combination of the Lithium Niobate substrate 306 and delay lines may be used to implemented variable delays 310. Referring to FIGS. 3 and 4, each or at least some of the delays 310 may be implemented using a combination of a variable delay 410 provided by the Lithium Niobate substrate 306 and one or more delay lines 420. In such examples, the delay attributed to the Lithium Niobate substrate 306 (variable delay 410) is again variable (adjusted by the control voltage 312), while the delay attributed to each delay line 420 may be fixed. In certain examples, multiple switched delay lines 420 can be used to accommodate multiple bit rates at lower speeds. Thus, one or more switches 430 can be included in at least some of the delays 310, and controlled via a control signal 432 to open or close the switches 430 as need to connect (or disconnect) the delay line(s) 420 to achieve a desired delay value. The control signal 432 may be a current or voltage and may be produced by the same or a different source as the control voltage 312. In implementations using both the Lithium Niobate substrate 306 and switchable delay lines 420, phase control of the output optical signal Y(t) may be provided by a combination of the control voltage 312 and control signal 432.

The values of the delays 310 are thus controlled by one or more external control signals/voltages, and therefore may be highly variable and flexibly altered. Accordingly, a wide range of bit rates may be accommodated by the filter 300 with only an adjustment of the control voltage(s) 312, 432, without requiring any other changes to the filter design or implementation.

Referring again to FIG. 3, as shown, the coefficients for weighting on the forward path are $B_0$ through $B_n$. The coefficients for weighting on the return path are $A_1$ through $A_n$. According to certain embodiments, rather than being implemented using gain elements, such as amplifiers, the coefficients may be implemented using programmable attenuators 320. The use of attenuators 320 rather than gain elements may reduce the complexity of the optical device. In certain examples, the attenuators 320 are connected to a control bus 330. Each attenuator 320 may be individually addressed and programmed via coefficient control words supplied over the control bus 330. Thus, the weighting coefficients can be dynamically altered by changing the control signal(s) supplied on the control bus to change the value(s) of any one or more of the programmable attenuators 320. Thus, the control signal(s) supplied on the control bus 330 provide amplitude control of the output optical signal Y(t). In certain examples, a gain element 340 may be connected on the input 302 to compensate for the losses due to the use of the attenuators 320 instead of gain elements.

The optical output signal Y(t) at the output 304 is generated by summing together multiple weighted delayed versions of the input signal X(t) and weighted delayed versions of the output signal Y(t), as shown in FIG. 3, using summers 350. According to certain embodiments, the filter 300 may be implemented on the substrate 308 as a photonic integrated circuit.

Figure 5:
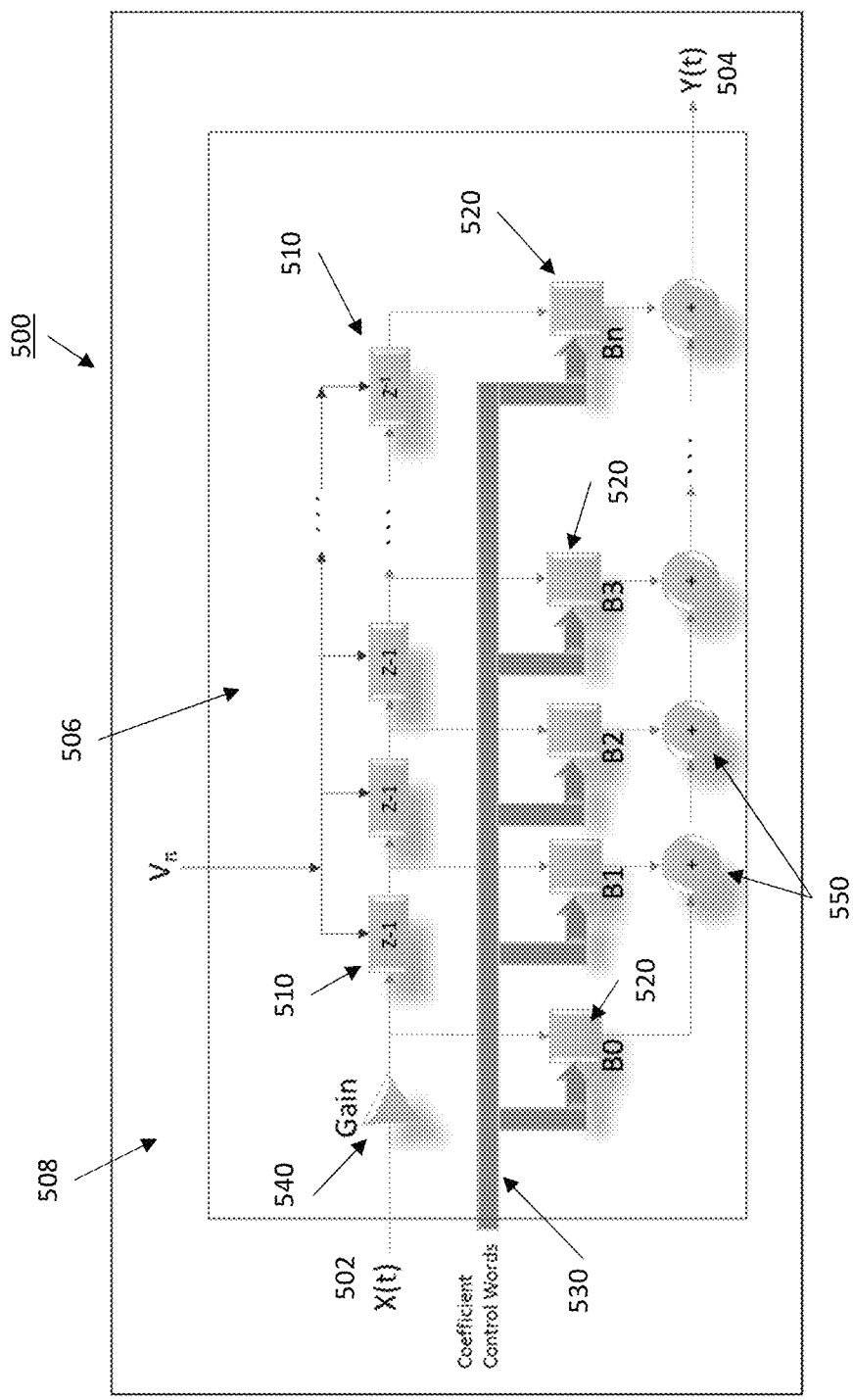
FIG. 5 is a diagram of one example of an analog optical FIR filter according to aspects of the present invention.

Further aspects and embodiments are directed to an optical FIR filter, which may also be implemented as a photonic integrated circuit, for example. FIG. 5 is a block diagram of one example of an optical FIR filter 500 according to certain aspects. As in FIG. 3, the optical input signal supplied at an input 502 of the filter 500 is represented by X(t), and the optical output signal supplied at an output 504 of the filter 500 is represented by Y(t). The input optical signal X(t) may be a phase modulated or intensity modulated optical signal. Both the input 502 and the output 504 may be fiber coupled, although that is not a requirement.

The optical FIR filter 500 includes a plurality of delays 510. As with a digital FIR filter, the delays 510 may be fixed as a function of a bit duration, and therefore, all the delays 510 may be the same duration. However, as with the IIR filter 300 discussed above, in certain examples, variable delay may be needed to accommodate different bit rates. As discussed above, according to certain embodiments, (for example, as may be used in applications performing high speed optical processing) the variable delays 510 may be implemented on a piezoelectric substrate 506, which may be made of a material such as Lithium Niobate (LiNbO$_3$), for example. As discussed above, the delay introduced by the Lithium Niobate substrate 506 is a function of an applied control voltage 512 ($V_\pi$). Thus, by adjusting the control voltage 512, the amount of delay can be varied to adjust to a given bit rate of the optical input signal X(t). Further, as discussed above with reference to FIG. 4, according to certain embodiments and applications (for example, for processing of optical signals modulated at radio frequency (RF) data rates), a combination of the Lithium Niobate substrate 506 and delay lines 420 may be used to implement the variable delays 510 in the same manner as in examples of the IIR filter 300. The control voltage 512, optionally in combination with the control signal 432, provides phase control of the optical output signal Y(t) by adjusting the variable delays 510.

Referring again to FIG. 5, the coefficients for weighting are B0 through Bn. According to certain embodiments, rather than being implemented using gain elements, such as amplifiers, the coefficients may be implemented using programmable attenuators 520. The use of attenuators 520 rather than gain elements may reduce the complexity of the optical device. In certain examples, the attenuators 520 are connected to a control bus 530. Each attenuator 520 may be individually addressed and programmed via a control signal (e.g., coefficient control words) supplied over the control bus 530. Thus, the weighting coefficients can be dynamically altered by changing the control signal(s) supplied on the control bus 530 to change the value(s) of any one or more of the programmable attenuators 520. Thus, the control signal(s) supplied on the control bus 530 provide amplitude control of the output optical signal Y(t). In certain examples, a gain element 540 may be connected on the input 502 to compensate for the losses due to the use of the attenuators 520 instead of gain elements. The weighted delayed version of the input signal X(t) are summed together using summers 550 to generate the output optical signal Y(t). According to certain embodiments, the filter 500 may be implemented on a substrate 508, which may be silicon, for example, as a photonic integrated circuit.

Thus, aspects and embodiments provide an approach to implement and externally configure, through the use of one or more control signals, optical IIR and optical FIR filters. For applications using high bit rates, and therefore relatively short delay values, the delays 310/510 can be implemented using a piezoelectric substrate 306/506, such as Lithium Niobate, for example. For lower data rates, where delays values greater than what may be provided by the piezoelectric substrate 306/506 alone, delay lines can be used in combination with the variable delay provided by the piezoelectric substrate 306/506. Multiple switchable fixed delay lines 420 can be used to support different delay values as may be needed for multiple different bit rates. The phase delay of the Lithium Niobate substrate 306/506 is controlled from an external voltage source. Similarly, switching of the delay line 420 may be controlled from an external source as well. Attenuators 320/520 may be used to weight each tap of the respective IIR filter 300 or FIR filter 500, as discussed above. Each attenuator 320/520 may be individually controlled from an external port via a control bus 330/530. An amplifier or other gain element 340/540 may be used to compensate for the loss introduced by the use of the attenuators 320/520. Coupling of the optical input signal X(t) to the optical filters 300/500 and coupling of the optical output signal from the optical filters 300/500 may be through a fiber optic cable or free space. As discussed above, the optical filters 300/500 are applicable for using with both phase and intensity modulated signals.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical infinite impulse response filter comprising:
   an input configured to receive an input optical signal;
   a first substrate on which at least a portion of the filter is implemented;
   a second substrate coupled to the first substrate;
   an output configured to provide an output optical signal that is a filtered version of the input optical signal;
   a plurality of input filter taps coupled to the input and configured to provide a corresponding plurality of weighted signal taps of the input optical signal;
   a plurality of output filter taps coupled the output and configured to provide a corresponding plurality of weighted signal taps of the output optical signal, each of the plurality of input filter taps and each of the plurality of output filter taps including a variable delay implemented in the second substrate and an individually addressable attenuator; and
   a plurality of summers configured to receive and sum the plurality of weighted signal taps of the input optical signal and the plurality of weighted signal taps of the output optical signal to produce the output optical signal at the output.

2. The optical infinite impulse response filter of claim 1 wherein the the second substrate is a piezoelectric substrate, and the optical infinite impulse response filter further includes a control input coupled to the piezoelectric substrate and configured to receive a control voltage that controls an amount of phase delay provided by the piezoelectric substrate.

3. The optical infinite impulse response filter of claim 2 wherein the piezoelectric substrate is a Lithium Niobate substrate.

4. The optical infinite impulse response filter of claim 2 wherein the variable delay further includes at least one delay line.

5. The optical infinite impulse response filter of claim 4 wherein the at least one delay line includes a plurality of switchable delay lines.

6. The optical infinite impulse response filter of claim 1 further comprising a gain element coupled to the input and configured to compensate for loss introduced by the individually addressable attenuators.

7. The optical infinite impulse response filter of claim 1 wherein a delay value of a variable delay is a function of a bit rate of the input optical signal, the optical infinite impulse response filter further comprising a control input configured to receive a control voltage that sets the delay value, the control voltage being adjustable to accommodate varying bit rates of the input optical signal, wherein the control voltage provides phase control of the output optical signal and the control signal on a control bus provides amplitude control of the output optical signal.

8. The optical infinite impulse response filter of claim 1, wherein the first substrate is a silicon substrate, further comprising:
   a control bus coupled to each individually addressable attenuator and configured to provide a control signal to each individually addressable attenuator to set an attenuation value of the individually addressable attenuator; and
   wherein the optical infinite impulse response filter is implemented on the silicon substrate as a photonic integrated circuit.

9. The optical impulse filter of claim 1 further comprising one or more delay lines, implemented on the second substrate, switchably coupled to at least one filter tap of the plurality of input filter taps or the plurality of output filter taps.

10. The optical impulse filter of claim 1 wherein at least the input, the output, and the summers are implemented on the first substrate.

11. The optical impulse filter of claim 10 wherein every element of the filter except the variable delay is implemented on the first substrate.

12. A method of operating an optical infinite impulse response filter, comprising:
- receiving, at an input coupled to a first substrate, an input optical signal;
- operating a plurality of input filter taps to process the input signal to provide a corresponding plurality of weighted signal taps of the input optical signal, each of the plurality of input filter taps including a variable delay implemented on a second substrate and an individually addressable attenuator; and
- operating a plurality of output filter taps to provide a corresponding plurality of weighted signal taps of the output optical signal, each of the plurality of output filter taps including a variable delay implemented on a second substrate and an individually addressable attenuator; and
- operating a plurality of summers to receive and sum the plurality of weighted signal taps of the input optical signal and the plurality of weighted signal taps of the output optical to produce an output optical signal, the output optical signal being a filtered version of the input optical signal.

13. The method of claim 12, further comprising:
operating a control bus to provide a control signal to each individually addressable attenuator to set an attenuation value of the individually addressable attenuator.

14. The method of claim 12, wherein the second substrate is a piezoelectric substrate, and
wherein the method further comprises controlling an amount of phase delay provided by the piezoelectric substrate via a control voltage applied to the piezoelectric substrate.

15. The method of claim 12 further comprising switchably operating one or more delay lines coupled to at least one filter tap of the plurality of input filter taps or the plurality of output filter taps to adjust the variable delay implemented on the second substrate.

16. The method of claim 12 wherein at least the input, output, and the summers are implemented on the first substrate.

17. The method of claim 16 wherein every element of the filter is implemented on the first substrate except the variable delay.

\* \* \* \* \*